D. B. HOWARD.
AIRCRAFT.
APPLICATION FILED OCT. 25, 1920.
1,419,261.
Patented June 13, 1922.
2 SHEETS—SHEET 1.
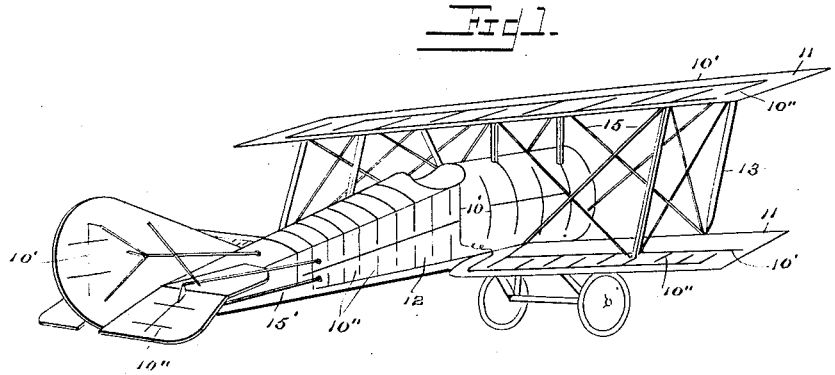
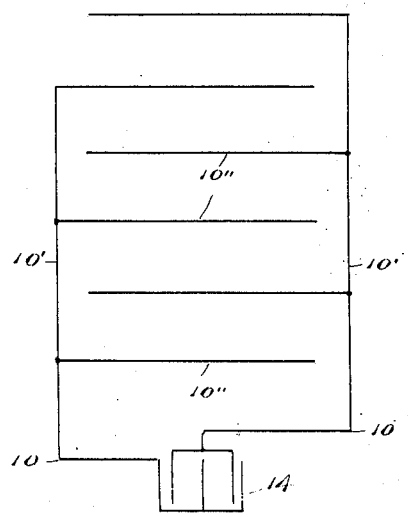

Dudley B. Howard, Inventor

UNITED STATES PATENT OFFICE.

DUDLEY BLANCHARD HOWARD, OF WASHINGTON, DISTRICT OF COLUMBIA.

AIRCRAFT.

1,419,261.    Specification of Letters Patent.    Patented June 13, 1922.

Application filed October 25, 1920. Serial No. 419,259.

*To all whom it may concern:*

Be it known that I, DUDLEY BLANCHARD HOWARD, a citizen of the United States, residing at Washington, in the District of Columbia, have invented certain new and useful Improvements in Aircraft, of which the following is a specification.

My invention relates to aircraft and in particular to means for discharging static charges of electricity generated on the external surfaces of an airplane, balloon, or other aircraft, by frictional contact with the air in flight.

The presence of static charges on the external surfaces of aircraft is objectionable for various reasons. It interferes with the operation of the radio apparatus, ignites combustible gas escaping from the motor feed system and sets the ship on fire, and furthermore represents a vast amount of potential electrical energy which is not being utilized for some useful purpose.

It is the primary object of my invention to discharge the static charges from the various frictional surfaces of an airplane or other aircraft through definite paths of conduction to a convenient point for storage in a Leyden jar or other suitable storage element.

Another object is to prevent dangerous sparking in the vicinity of gas-containing or gas-conducting apparatus by establishing good electrical connection between all metallic parts embodied in the construction of the aircraft. According to the present practice, many of these metallic parts are insulated from each other by interposed dielectrics. High tension static charges are apt to jump between adjoining metallic parts, thus causing sparks which often produce disastrous results.

A further object is to apply the invention to all-metal airplanes, whereby static charges may be discharged before they can cause sparking or injury to the metal.

In a general way it is the object of my invention to take advantage of this phenomena, which has heretofore been a source of annoyance and danger, by harnessing the static electricity which is gathered from the air during flight and utilizing the same in the opration of the radio and motor-ignition systems.

Still further objects may appear as the following specific description is read in connection with the accompanying drawings, in which:

Fig. 1 is a perspective view of an airplane showing diagrammatically the means for collecting and discharging static charges applied to the frictional surfaces of the planes and fuselage;

Fig. 2 is a diagrammatic view of the electrical circuits;

Figure 3:
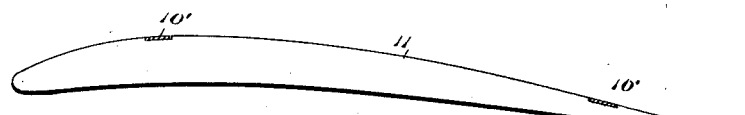
Fig. 3 is a vertical section through one of the planes of an airplane of the usual type, showing in detail the manner in which the electrical conductors are applied thereto.

In the present specification the invention will be described in its application to an airplane, but it is to be understood that I do not necessarily limit myself to the use of my apparatus for discharging static charges in airplanes. It may be employed on balloons and other types of aircraft.

In discharging static charges from the frictional surfaces of an airplane, a suitable system of wiring is disclosed in Figs. 1 and 2 of the accompanying drawings.

As shown particularly in Fig. 1, electrical conductors 10 may be arranged on the external surfaces of the planes 11, fuselage 12, struts 13, and other parts of an airplane in such a manner that they will collect any static charges produced by frictional contact of these surfaces with the air during flight of the ship and will conduct the current thus produced through definite paths of conduction to a convenient point for storage. The storage element employed is preferably in the form of the Leyden jar 14, Figs. 2 and 7. It is obvious, however, that some more suitable storage element might be adopted without departing from the scope of the invention.

A convenient arrangement of conductors, or discharge wires, is to have comparatively long lead wires 10' extending in parallelism along the axes of the ships, with short collecting terminals 10" branching off from the lead wires and disposed parallel to each other. These terminals alternate in their connection with the two lead wires, and adjacent wires are sufficiently close to each other to facilitate effective collection and discharge of all static charges. The proximity of adjacent terminal wires has a further advantage which will be considered presently.

By electrically connecting the metallic stays 15 of the wing and fuselage trussing with adjacent conductors 10 of the discharging apparatus, these stays may be brought into the electrical circuit. It is desirable also that the conductors 10 shall be connected with the controls 15' for the rudder and elevators. The controls are thus included in the circuit and are adapted to serve as conductors leading to the short sections of conductors 10 provided on the external surfaces of the rudder and elevators.

The conductors 10 may be in the form of wires constructed of any desired conducting material and having any suitable cross-sectional contour. Flat strips of copper or other conducting metal will offer negligible resistance to the air, especially if inlaid in the skin of the ship in the manner illustrated in Fig. 3, and will at the same time be of sufficient cross-sectional area. By running the lead wires 10' and terminals 10" along the outer edges of the spars and ribs, respectively, of the planes, attachment of the conductors is simplified. In like manner the lead wires may follow the longerons of the fuselage.

Figure 4:
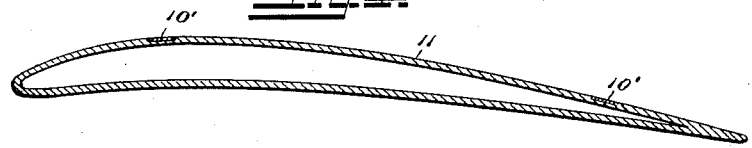
Fig. 4 is a similar view showing the electrical conductors applied to an all-metal plane.

In applying the invention to an all-metal plane, conductors of a metal which is a better conductor of electricity than the metal used in the manufacture of the planes may be inlaid in the exterior surfaces of the planes in electrical contact with the metal thereof, as shown in Fig. 4. These conductors thus offer paths of less resistance for the conduction of static charges.

Figure 5:
Fig. 5 is a similar view illustrating another method of applying the invention to an all-metal plane.

In order to collect the static charges generated on the exterior surfaces of an all-metal airplane and discharge the same in an efficient manner, the surfaces may be covered with a coating 16 of insulating material as shown in Fig. 5 and the conductors 10 may be applied to the exterior surface of the coating. The insulating coating prevents the static charges from entering the metal of the airplane fuselage and wings. The charges will therefore be collected by the conductors 10 without loss.

Figure 6:
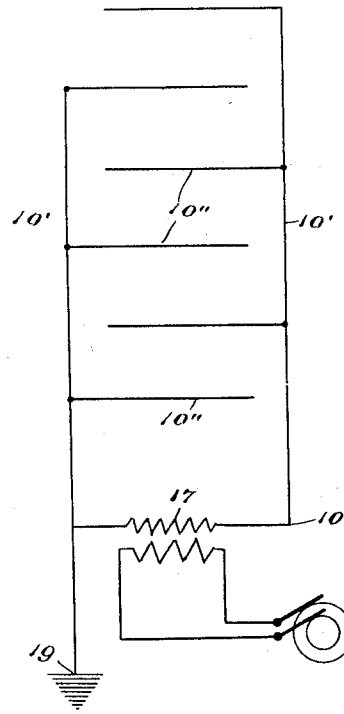
Fig. 6 is a diagrammatic view of the electrical circuits in a modified form of apparatus.

Should it be desired to neutralize the static charges instead of collecting and storing the same, the same wiring may be used, but, instead of a storage cell, an induction coil 17 may be connected in the circuit in the manner illustrated diagrammatically in Fig. 6. The primary of the induction coil may be connected with a source of alternating current as represented conventionally at 18. The secondary circuit in which the collecting conductors 10 are included may be " grounded " in the motor frame or other metallic body of large static capacity, as at 19. By converting the apparatus in this manner, the conductors 10 will carry alternating current which will neutralize the static charges. The conductors 10 afford a plurality of pairs of discharge wires which are located close together and establish an electrostatic field. The alternating charges on any two adjoining wires of front and rear series are so timed in relation to each other that at any given instant the charges on both will be of opposite sign.

Figure 7:
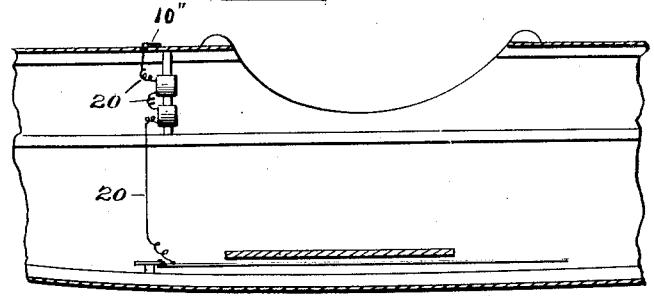
Fig. 7 is a vertical sectional view of part of an airplane fuselage, showing the method of establishing good electrical connection between metallic parts which are separated by dielectrics.
Figure 8:
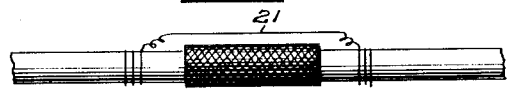
Fig. 8 is a side elevation of a section of the fuel feed pipe showing a flexible connection at one of its joints and an electrical conductor bridging the joint.

In Fig. 7, I have shown the interior of an airplane fuselage with the instruments and other metallic parts, which are customarily separated from each other by dielectrics, connected electrically by conductors 20. These conductors are in turn connected with the conductors 10. It is to be understood that my invention contemplates the electrical connection of all metallic parts of the aircraft in order that capacity for the static charges will be provided and sparking between metallic parts will be avoided. When the joints in the fuel feed pipe have interposed flexible connections, such as short sections of rubber tubing, to allow for vibration, especially in all-metal airplanes, sparks are apt to jump the gap between metallic sections of the pipe and ignite the fuel. I propose to avoid this danger by bridging the joints with electrical terminal connectors 21 as shown in Fig. 8.

Figure 9:
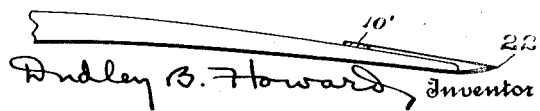
Fig. 9 is a vertical section through the trailing edge of the wing of an airplane, showing a dissipating point connected with one of the collecting conductors.

Should it be desired to equalize the electrostatic conditions on the aircraft with those of the surrounding atmosphere, this may be accomplished by providing sharp discharge points 22 on the conductors 10 at some suitable location, as indicated in Fig. 9. The charges will leak from the points 18 and thereby become dissipated.

Under some conditions of practice, neutralization or dissipation of the static charges may be preferable to storage.

While I have disclosed certain specific embodiments of the inventive idea, it is to be understood that I do not limit myself necessarily to these details. Various changes may be made to meet the requirements of practice without departing from the scope of the invention.

I claim:

1. The method of discharging static electricity from the surfaces of aircraft of the all-metal type which consists in covering the said surfaces with a coating of insulating material and collecting the static charges from the exterior surface of the coating.

2. In an apparatus for discharging static electricity from the surfaces of all-metal aircraft, a coating of dielectric material for the said surfaces, and a conductor disposed on the external surface of the coating.

3. In an apparatus for discharging static electricity from the surfaces of all-metal aircraft, a coating of dielectric material for the said surfaces, a conductor disposed on the external surface of the coating, and a storage element connected to the said conductor.

4. In an apparatus for discharging static electricity from the surfaces of all-metal aircraft, a conductor of material which is a better conductor of electricity than the metal of the aircraft disposed on the said surfaces in electrical contact with the latter, and a storage element connected to the said conductor.

In testimony whereof I have affixed my signature.

DUDLEY BLANCHARD HOWARD.